United States Patent
Toth et al.

(10) Patent No.: US 7,229,699 B2
(45) Date of Patent: Jun. 12, 2007

(54) BEARING HAVING EMBEDDED HARD PARTICLE LAYER AND OVERLAY AND METHOD OF MANUFACTURE

(75) Inventors: James R. Toth, Ann Arbor, MI (US); Barry Schwab, White Lake, MI (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 240 days.

(21) Appl. No.: 11/006,273

(22) Filed: Dec. 7, 2004

(65) Prior Publication Data

US 2006/0120645 A1 Jun. 8, 2006

(51) Int. Cl.
*F16C 33/12* (2006.01)

(52) U.S. Cl. ............... 428/559; 428/612; 428/645; 384/912; 384/913; 29/898.12; 29/898.13; 29/898.14; 29/898.15

(58) Field of Classification Search ............... None
See application file for complete search history.

(56) References Cited

U.S. PATENT DOCUMENTS

| | | | | |
|---|---|---|---|---|
| 3,950,141 | A | * 4/1976 | Roemer | 428/643 |
| 4,125,637 | A | 11/1978 | Tanner | 427/198 |
| 4,718,155 | A | 1/1988 | Warriner et al. | 29/149.5 |
| 4,973,523 | A | 11/1990 | Neuhaus et al. | 428/653 |
| 5,137,792 | A | * 8/1992 | Hodes et al. | 428/614 |
| 5,195,244 | A | 3/1993 | Green | 29/898.12 |
| 5,433,531 | A | 7/1995 | Thompson | 384/276 |
| 5,601,371 | A | 2/1997 | Koroschetz et al. | 384/276 |
| 5,925,471 | A | 7/1999 | Eastham et al. | 428/650 |
| 6,045,929 | A | 4/2000 | Eastham et al. | 428/650 |
| 6,077,815 | A | 6/2000 | Grunthaler et al. | 508/108 |

(Continued)

FOREIGN PATENT DOCUMENTS

GB 2175920 A * 12/1986

*Primary Examiner*—John J. Zimmerman
(74) *Attorney, Agent, or Firm*—Robert L. Stearns; Dickinson Wright, PLLC

(57) ABSTRACT

A multilayer sliding bearing includes a rigid metal backing having a metal bearing liner attached thereto. The metal bearing liner includes a metal bearing liner layer which is attached to the bearing surface of the metal backing layer and at least one metal overplate layer deposited over an outer surface of the metal bearing liner layer. The metal bearing liner layer has a layer of hard particles embedded in an outer surface thereof which is adjacent to the inner surface of the at least one metal overplate layer. The bearing may also include a barrier layer interposed between the metal bearing liner layer and the metal over plate layer to inhibit diffusion therebetween and/or promote adhesion of the metal over plate layer to the metal bearing liner layer. The invention may also include a thin metal protective coating layer over the outer surface of the bearing liner and backing layer. The invention also includes a method of making a multilayer sliding bearing which includes the steps of fabricating a metal backing layer having a bearing surface, attaching a metal bearing liner layer having an outer surface to the bearing surface of the metal backing layer, embedding a layer of hard particles in the outer surface of the metal bearing liner layer and depositing at least one metal overplate layer over the outer surface of the metal bearing liner layer. The method may also include a step of depositing a barrier layer over the outer surface of the metal bearing liner layer prior to depositing the metal overplate layer.

16 Claims, 3 Drawing Sheets

U.S. PATENT DOCUMENTS

| | | | |
|---|---|---|---|
| 6,086,742 A | 7/2000 | Huhn et al. | 205/171 |
| 6,178,639 B1 | 1/2001 | Lytwynee et al. | 29/898.047 |
| 6,197,432 B1 | 3/2001 | Fujita et al. | 428/553 |
| 6,227,709 B1 | 5/2001 | Lehmann et al. | 384/294 |
| 6,234,678 B1 | 5/2001 | Tsuji et al. | 384/276 |
| 6,312,579 B1 | 11/2001 | Bank et al. | 205/95 |
| 6,337,145 B1 | 1/2002 | Pratt | 428/645 |
| 6,357,917 B1 | 3/2002 | Lyon et al. | 384/276 |
| 6,357,918 B1 | 3/2002 | Kagohara et al. | 384/276 |
| 6,382,838 B1 | 5/2002 | Yamada et al. | 384/294 |
| 6,451,452 B1 * | 9/2002 | Niegel et al. | 428/648 |
| 6,609,830 B2 | 8/2003 | Bank et al. | 384/276 |
| 6,802,649 B2 | 10/2004 | Kawagoe et al. | |

* cited by examiner ents mentioned above provides excellent conformability and embedability characteristics and good fatigue resistance of typical bearing layers. However, as the output and efficiency of engines increases, so does the dynamic loading placed on the crank shaft bearings, and thus the increased potential for bearing fatigue. Under extreme loading conditions, the conventional bearings described above employing the single 25 μm thick overplate of lead-tin-copper may be prone to fatigue. Efforts to alleviate fatigue by simply decreasing the thickness of the single layer overplate to less than 25 μm have been generally unsuccessful, as it is at the cost of sacrificing acceptable levels of conformability and embedability. As performance requirements increase, there exists a need in the industry for an improved journal bearing that can perform under such extreme high dynamic loading conditions by providing a sufficient thicknesses of the soft overlay to promote acceptable conformability and embedability while at the same time also enabling the use of stronger more fatigue resistant bearing alloys which also possess the necessary wear properties and resistance to seizure of the bearing layer.

BEARING HAVING EMBEDDED HARD PARTICLE LAYER AND OVERLAY AND METHOD OF MANUFACTURE

BACKGROUND OF THE INVENTION

1. Technical Field

The present invention relates generally to plain bearings and to methods of their manufacture. More particularly, the invention relates to multilayer engine bearings of the type having a metal backing on which a functional bearing layer is applied which in turn is plated with an overlay of soft metal. Most particularly, the invention relates to multilayer bearings having a functional bearing layer having a surface layer of hard particles embedded therein which is overlaid by a layer of a soft metal, and optionally, with a diffusion barrier layer between the soft metal layer and the functional bearing layer.

2. Related Art

Plain engine journal-type bearings for use in high load engine applications for journaling crank shafts and the like typically include a bearing lining layer having a functional bearing layer of either copper-lead or aluminum alloys applied to a steel backing. A single layer of a lead-tin-copper alloy having a thickness of about 25 μm is typically over-plated onto the functional layer. Often, a nickel diffusion barrier or copper bonding layer is interposed between the overplate and functional layer to prevent the tin from diffusing from the overplate into the bearing layer. As a final step, the bearing may optionally be coated with a micro-thin layer of tin or lead-tin flash plating having a thickness of about 1 μm or less. The flash plating is both functional and aesthetic, giving the product a protective outer layer and a bright, pleasing appearance. It also provides a level of corrosion protection to the steel backing. Within a short time during the break-in period of the engine, the flash plating applied to the running surface of the bearing is worn away by the action of the components being born by the bearing.

In service, such multilayer crank shaft bearings are subjected to high dynamic loads that vary in-magnitude and direction due to the inertial loads applied by the piston and connecting rod mechanism and by the combustion gases. The soft overplate layer enables such bearings to conform under high load forces to any misalignments or changes in profile of loading of the member being journaled, so that the loads are distributed across a greater surface area of the bearing. The overplate also allows any foreign particles of dirt or metal that may come between the bearing surface and the member being journaled to become embedded or absorbed into the bearing surface, so as to protect both the bearing and the component being journaled from excessive wear or damage.

It is generally accepted that conformability and embedability of the overplate are dependent upon overplate thickness, with a thicker overplate being preferred. It is also generally known that as the thickness of the overplate increases, so does the susceptibility to bearing fatigue (i.e., the fracturing of the bearing surface when under load). Resistance to fatigue cracking requires that the bearing surface possess sufficient tensile strength to enable it to undergo minor configuration changes without cracking. However, it is also generally known that certain alloys which would otherwise exhibit improved strength and resistance to fatigue, are also more susceptible to sliding wear processes and seizure of the bearing layer to the journaled component, such as the crank shaft, during operation of the engine. Thus, it is has been necessary to balance the properties of conformability and embedability with fatigue resistance of the bearing layer when designing engine bearings, particularly ones that are subjected to high dynamic loading.

For many high load engine applications, it has been found that the 25 μm thick single layer lead-tin-copper alloy overplate mentioned above provides excellent conformability and embedability characteristics and good fatigue resistance of typical bearing layers. However, as the output and efficiency of engines increases, so does the dynamic loading placed on the crank shaft bearings, and thus the increased potential for bearing fatigue. Under extreme loading conditions, the conventional bearings described above employing the single 25 μm thick overplate of lead-tin-copper may be prone to fatigue. Efforts to alleviate fatigue by simply decreasing the thickness of the single layer overplate to less than 25 μm have been generally unsuccessful, as it is at the cost of sacrificing acceptable levels of conformability and embedability. As performance requirements increase, there exists a need in the industry for an improved journal bearing that can perform under such extreme high dynamic loading conditions by providing a sufficient thicknesses of the soft overlay to promote acceptable conformability and embedability while at the same time also enabling the use of stronger more fatigue resistant bearing alloys which also possess the necessary wear properties and resistance to seizure of the bearing layer.

SUMMARY OF THE INVENTION

The present invention is a multi-layer bearing, such as a journal bearing having a soft overplate layer which provides conformability and embedability, which also has a bearing lining which includes a layer of embedded hard particles at an outer surface thereof in order to provide improved wear performance and resistance to seizure of the bearing in operation.

A multilayer bearing of the invention, such as a sliding bearing, includes a metal backing layer having a bearing surface. The bearing also includes a metal bearing liner layer attached to the bearing surface of the metal backing layer which has a layer of hard particles embedded in its outer surface. The bearing also includes at least one metal overplate layer deposited over the outer surface of the metal bearing liner layer. The bearing may also optionally include a barrier layer interposed between the metal bearing liner layer and the at least one metal overplate layer for the purpose of providing a diffusion barrier there between or promoting the adhesion of the metal overplate layer to the metal bearing liner layer.

The hard particles utilized will have a hardness greater than that of the metal bearing liner layer, preferably substantially harder than the hardness of this layer. The hard particles may be selected from a group consisting of pure metals and metal alloys which have a hardness greater than the hardness of the metal bearing liner layer, metal carbides, metal silicides, metal nitrides and metal borides.

The present invention also includes a method of making a multilayer sliding bearing. The method includes fabricating a metal backing layer having a bearing surface. The method also includes a step of attaching a metal bearing liner layer having an outer surface to the bearing surface of the metal backing layer. The method also includes embedding a layer of hard particles in the outer surface of the metal bearing liner layer and depositing at least one metal overplate layer over the outer surface of the metal bearing liner layer after the hard particles have been embedded. The method may also optionally may include depositing a barrier layer over the bearing liner layer prior to depositing the metal overplate layer.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
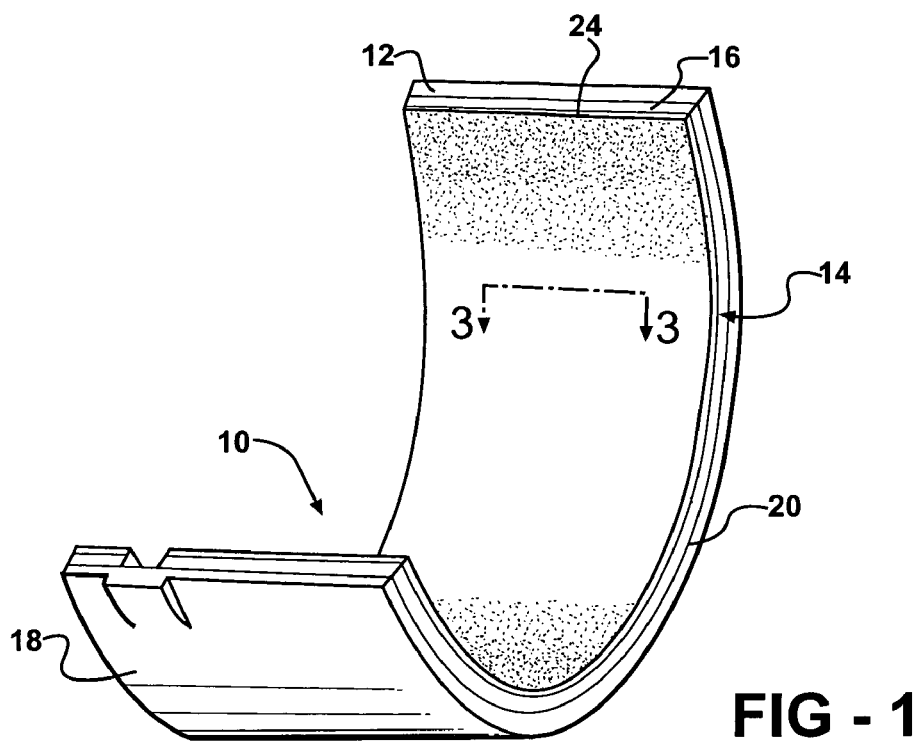
FIG. 1 is a perspective view of one embodiment of a multilayer bearing of the present invention.

A multilayer bearing constructed according to the invention is shown generally at 10 in FIG. 1 and is of the sliding type often referred to as a journal bearing or plain bearing of the type which are used in pairs between two relatively rotatable components, such as a connecting rod and crank shaft, to establish a journaled connection therebetween. Such multilayer bearings of the type to which the invention is directed also include multilayer bushings.

Figure 3A:
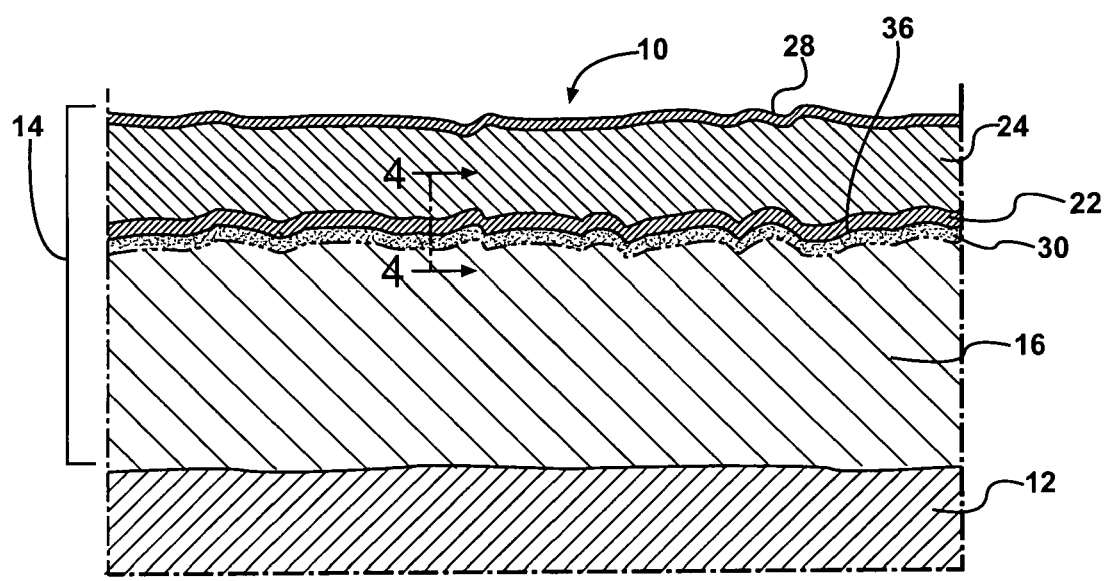
FIG. 3A is an enlarged fragmentary sectional view of one embodiment of the bearing layer and overlay of the invention taken generally along line 3—3 of FIG. 1.
Figure 4:
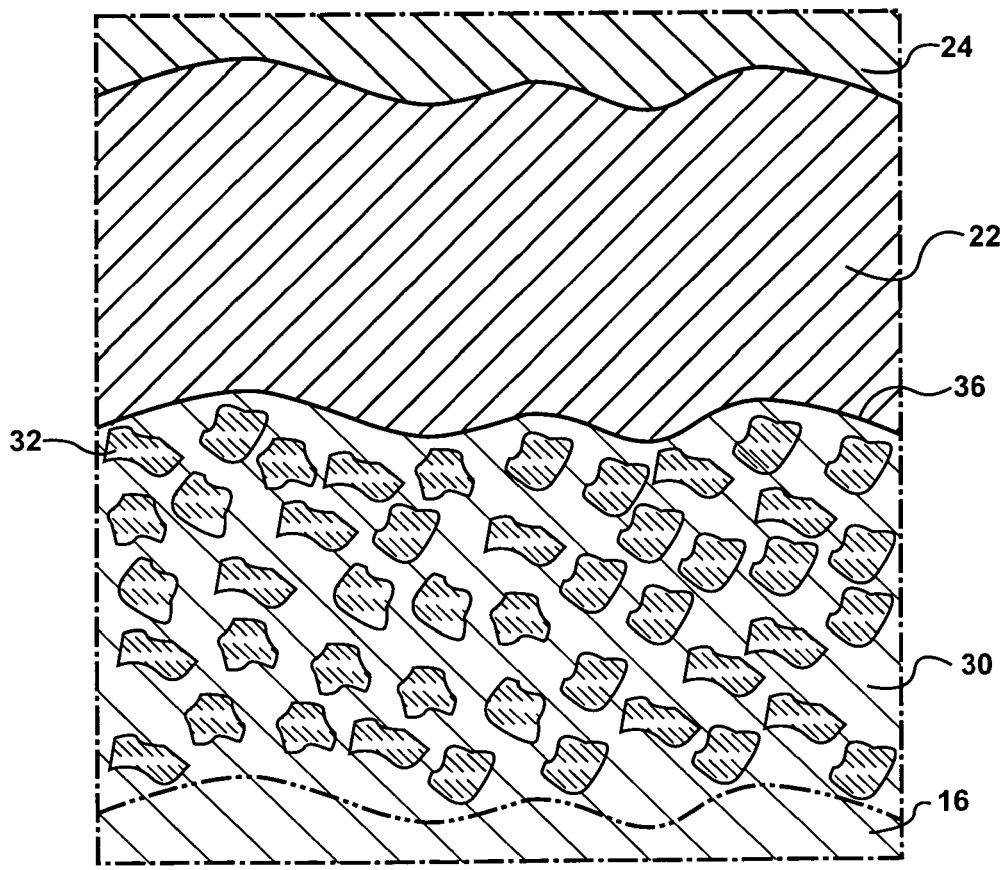
FIG. 4 is an enlarged fragmentary sectional view taken generally along line 4—4 of FIG. 3A.

Referring to FIGS. 1, 3A and 4, a bearing 10 constructed according to the invention includes a rigid metal support backing 12 and a multilayer bearing liner 14 which includes multiple layers of metallic bearing material formed on the backing which collectively form the foundation of the bearing 10. Bearing liner 14 includes a bearing lining layer 16 which is the principal bearing material of bearing 10. The backing 12 preferably comprises an arcuate, semi-circular strip of steel having a convex outer surface 18 adapted for seating in a mating concave support structure, and an opposite concave inner surface 20 which is the bearing surface onto which the bearing liner 14 is applied.

The bearing liner layer 16 may be formed of conventional bearing layer materials, including alloys comprising copper-lead or aluminum of conventional compositions, which may be sintered, cast, clad or otherwise formed on or bonded to the inner surface 20 according to well known practice. According to the invention, it is believed that stronger, non-conventional alloys, such as $CuSn_8Ni$ may also be utilized as bearing lining layer 16 within bearing liner 14. Such alloys would not normally be utilized in bearings of conventional construction, because of the possibility of bearing failure due to seizure of the bearing to the journaled component.

Bearing liner 14 may also include a thin barrier layer or film 22 (i.e., about 1 to 2 μm thick) of either nickel or copper or other materials effective as a diffusion barrier and/or an adhesion promotion or bonding layer between the constituent materials of bearing liner layer 16 and the overplate layer 24 described below. The barrier layer 22 may be electro- plated or otherwise deposited onto the bearing liner 14 and bearing lining layer 16 according to conventional practice.

Figure 2:
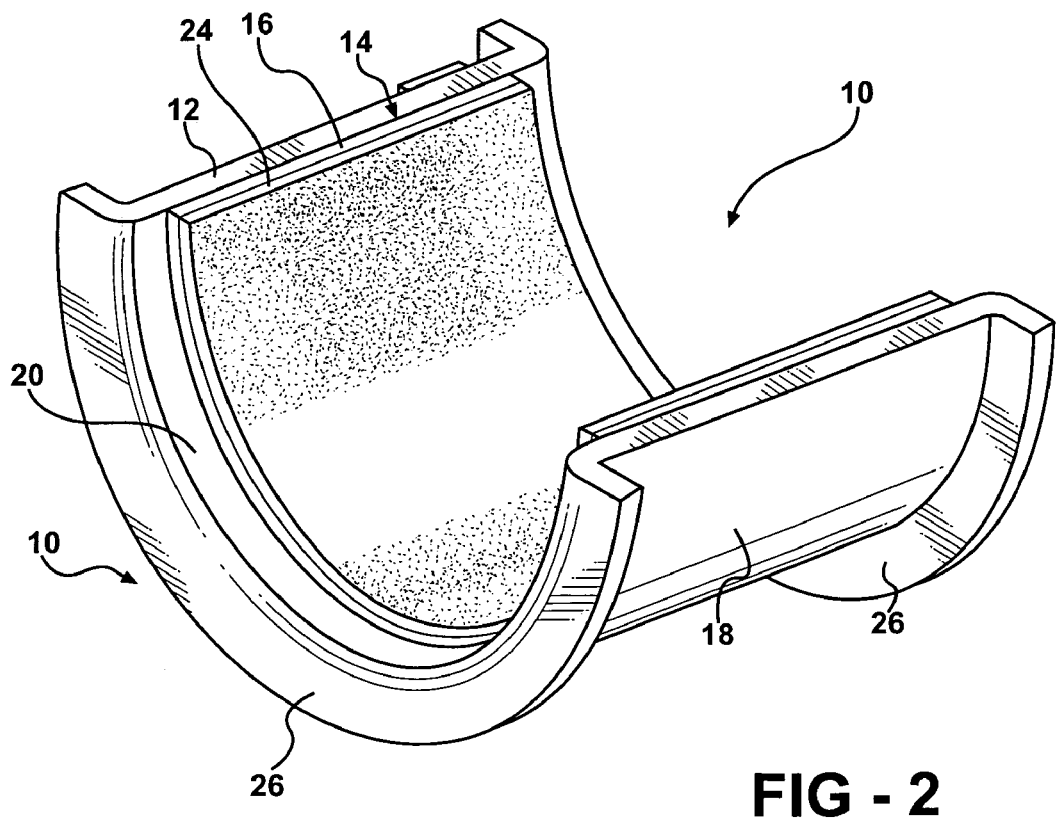
FIG. 2 is a perspective view of a second embodiment of a multilayer bearing of the present invention.

Bearing liner 14 also includes an overlay or overplate layer 24. The overplate layer 24 may be formed as a single layer of a pure metal or an alloy from conventional overplate materials, which are generally soft and ductile and provide conformability and embedability as described herein, such as PbSnCu, PbSn or PbIn alloys. Overlay or overplate layer 24 may be plated, including by electroplating or electroless plating, or otherwise deposited onto the bearing liner 14 and bearing lining layer 16 according to conventional practice. Alternately, overplate layer 24 may comprise a multilayer overplate layer 24 of the types or formed by the methods described in U.S. Pat. Nos. 6,077,815; 6,086,742; 6,178,639 B1; 6,227,709 B1; 6,312,579 B1; 6,337,145 B1; and 6,609,830 B2; which are hereby incorporated herein by reference in their entirety. The embodiment shown in FIG. 1 is an embodiment according to the invention using a bearing without thrust flanges (i.e., a smooth bearing). Referring to FIG. 2, the present invention may be used in bearings of similar construction with thrust flanges 26 (i.e., a flange bearing).

Bearing liner 14 may also include a thin metal protective layer 28, such as a very thin layer of tin, to protect the bearing liner 14 and/or backing layer 12.

In one example of a multilayer structure, overplate 24 comprises at least two layers plated from the same bath at different current densities, an outer layer and an inner layer with reference to the bearing lining layer 16. The outer layer may be plated at a relatively high current density to yield a relatively soft overplate layer having a thickness of about 3 to 7 μm, and preferably about 5 μm thick to provide good conformability and embedability characteristics of the overplate. The inner layer may be plated at a relatively lower current density to yield a relatively harder layer than that of the outer layer having a thickness ranging from about 7 to 13 μm, and preferably about 10 μm to provide a supportive backing for the outer layer for good fatigue strength characteristics of the overplate. It will be understood that the particular two layer example described is but one of numerous variants that could be employed and are contemplated by the invention. The layers could, for example, be reversed such that the outer layer is harder than the inner layer or the thicknesses varied to meet the needs of a particular application. The common characteristic among all contemplated variants is that the multiple overplate layers are produced from the same electroplate bath and plated at different current densities to yield a composite lamellar structure having two or more layers of differing deposit characteristics, such as hardness.

Figure 3B:
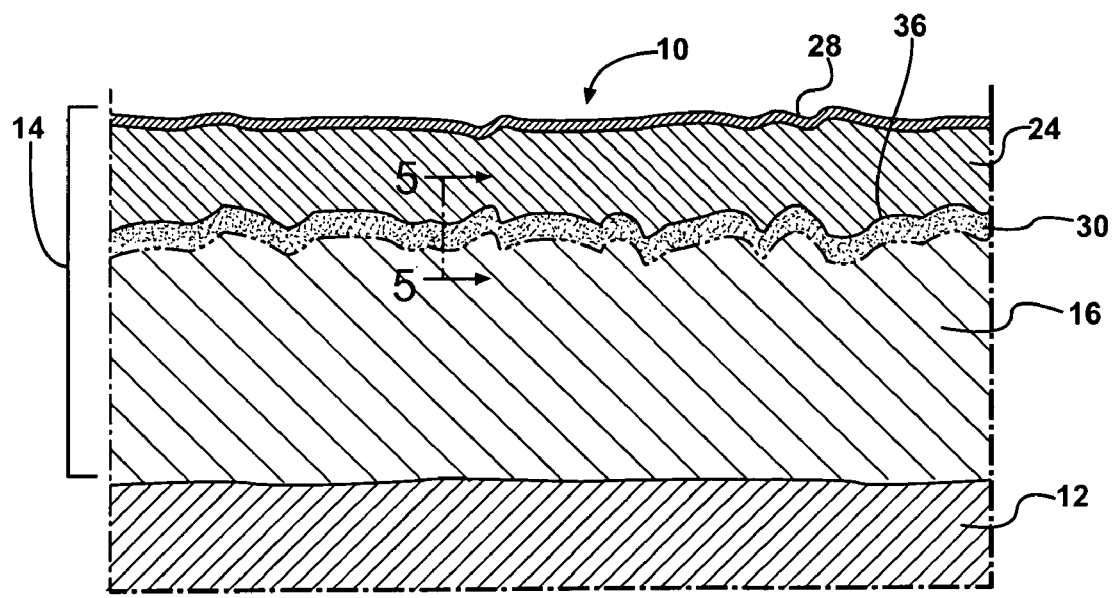
FIG. 3B is an enlarged fragmentary sectional view of a second embodiment of the bearing layer and overlay of the invention taken generally along line 3—3 of FIG. 1.
Figure 5:
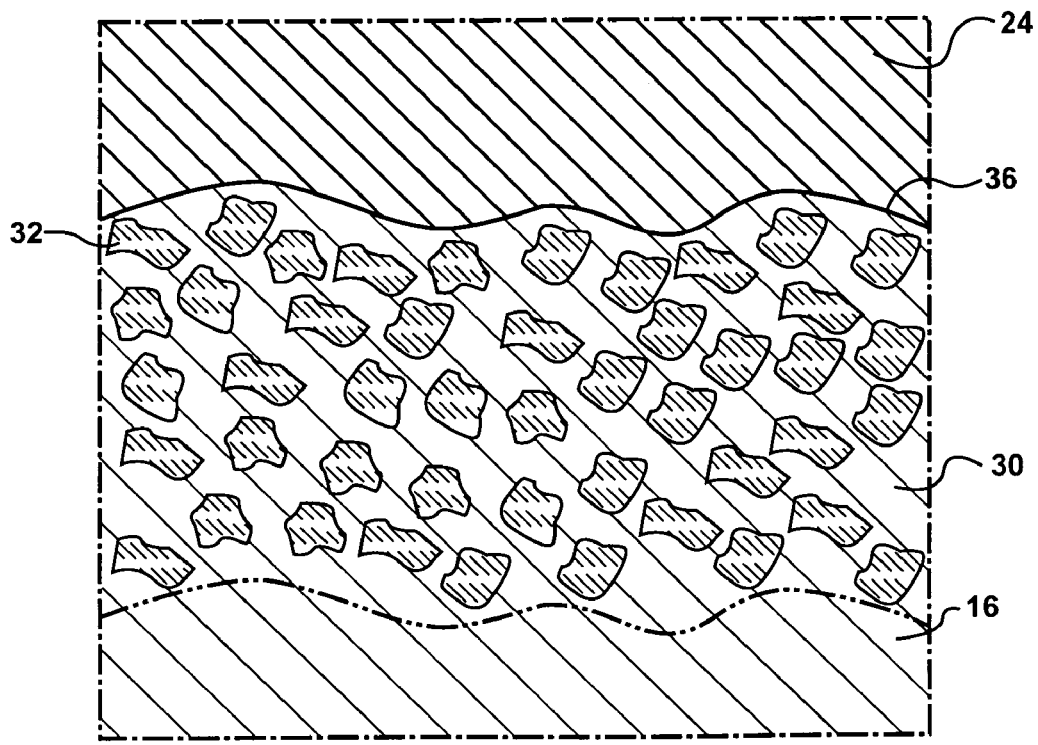
FIG. 5 is an enlarged fragmentary sectional view taken generally along line 5—5 of FIG. 3B.

Referring to FIGS. 1, 3B and 5, a second embodiment of a bearing 10 constructed according to the invention is illustrated. The numbering of like elements is consistent with the embodiment described above. This embodiment includes a rigid metal support backing 12 and a bearing liner 14 of metallic bearing material formed on the backing, which collectively forms the foundation of the bearing 10. Bearing liner 14 includes a bearing lining layer 16 which is the principal bearing material of bearing 10. The backing 12 preferably comprises an arcuate, semi-circular strip of steel having a convex outer surface 18 adapted for seating in a mating concave support structure, and an opposite concave inner surface 20 on which the bearing liner 14 is applied. This embodiment does not include a diffusion barrier.

As described above, the overplate layer 24 may be formed as a single layer of a pure metal or an alloy from conventional overplate materials, which are generally soft and ductile and provide conformability and embedability as described herein, such as PbSnCu, PbSn or PbIn alloys. Overlay layer 24 may also be plated, including electroplating or electroless plating, or otherwise deposited onto the bearing liner 14 and bearing lining layer 16 according to conventional practice. Alternately, overplate layer 24 may comprise a multilayer overplate layer The construction described thus far with respect to the bearing lining 14, including the bearing lining layer 16, barrier layer 22 and overplate layer 24, is conventional. Where the invention departs from conventional practice is that following the fabrication of the bearing lining layer 16, and prior to application of the overplate layer 24 or barrier layer 22 onto lining layer 16, a layer 30 of hard particles 32 is embedded into a portion of bearing lining layer 16 proximate an outer surface 36 of bearing lining layer 16. Hard particles 32 may be any suitable hard particles 32, such as various pure metal, metal alloys, semi-metals, intermetallic compounds, metal oxides, metal nitrides, and metal carbides, including mixtures thereof. When metal or metal alloy particles are utilized, they will be harder than this material. Examples of preferred hard particles are listed in Table 1.

TABLE 1

| Material Type | Examples |
| --- | --- |
| Pure Elements: | W, Ta, Cr, Si, Ti |
| Carbides: | SiC, $B_4C$, $Cr_{23}C_6$, TaC, TiC, WC, ZrC |
| Oxides: | $Al_2O_3$, $Cr_2O_3$, $Fe_2O_3$, $SiO_2$, TiO, $ZrO_2$ |
| Nitrides: | BN (hexagonal), BN (cubic), $Si_3N_4$, AlN |
| Borides: | $Cr_3B_2$, $TiB_2$, $TaB_2$ |
| Silicides: | $TaSi_2$, $Fe_4Si_3$ |

Hard particles 32 will preferably be selected for compatibility, including chemical, conformability and embedability compatibility, with respect to the bearing lining layer 16. The hard particles 32 are preferably embedded to a depth up to 0.1–1 µm from outer surface 36. The layer 30 of hard particles 32 may be embedded using any suitable method, but will preferably be embedded by tumbling a partially completed bearing assembly comprising metal backing 12 to which bearing lining layer 16 has been bonded in a container which contains hard particles 32 selected for a given application. Various known tumbling media may be used to affect the impingement of the hard particles 32 on surface 36 of bearing lining layer 16 so as to cause hard particles 32 to be embedded therein forming hard particle layer 30. The duration, speed, size of the container and other known factors may be adjusted to vary the depth to which hard particles 32 are embedded and the volume or weight fraction of hard particles 32 versus the metal matrix from bearing lining layer 16 with hard particle layer 30. A method for embedding alumina hard particles on a metal bearing surface is described in commonly assigned U.S. Pat. No. 5,433,531, which is hereby incorporated herein by reference in its entirety. The hard particles 32 will preferably comprise in the range of 0.5–5.0 percent of the surface area of the hard particle layer 30.

Following the step of embedding hard particles 32 to form hard particle layer 30, the method of the invention may also include a step of finishing the profile of the outer surface 36 of the bearing lining layer 16 to its finished dimensions, such as by machining or grinding. It is preferred that step of finishing the profile minimize the removal of material from surface 36, so as to maintain to the maximum extent possible the thickness of hard particle layer 30.

Following the step of finishing the profile of bearing lining layer 16 which contains hard particle layer 30, the method of the invention preferably includes a step of plating barrier layer 22 when barrier layer 22 is employed. This step may be preceded by a step of cleaning or degreasing the outer surface 36 of hard particle layer 30. Materials and methods for degreasing are well known.

Following the step of plating barrier layer 22, the method of the invention preferably includes a step of plating overlay or overplate layer 24. Materials for forming overlay layer 24 are well known, as are plating methods for forming this layer. This step may also be preceded by a step of cleaning or degreasing the outer surface 36 of hard particle layer 30 or barrier layer 22 when it is employed. Materials and methods for degreasing are well known.

Following the step of plating overlay 24, the method of the invention preferably includes a step of plating a thin layer of a protective coating 28, such as tin. This step may also be preceded by a step of cleaning or degreasing the outer surface of overlay layer 24. Materials and methods for degreasing are well known. Once the overplate is applied, the usual thin flash coat of tin (not shown) may be applied to the bearing 10.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A multilayer sliding bearing, comprising:
a metal backing layer having a bearing surface;
a metal bearing liner layer attached to the bearing surface of said metal backing layer;
said metal bearing liner layer having a layer of hard particles embedded therein only at an outer surface thereof to a depth of 0.1 to 1 µm; and
at least one metal overplate layer deposited over the outer surface of said metal bearing liner layer.

2. The bearing of claim 1, wherein the hard particles comprise a material selected from a group consisting of pure elements and metal alloys which have a hardness greater than a hardness of the metal bearing liner layer, metal carbides, metal silicides, metal nitrides and metal borides.

3. The bearing of claim 2, wherein the group is W, Ta, Ti, Cr, Si, SiC, $B_4C$, $Cr_{23}C_6$, TaC, TiC, WC, ZrC, $Al_2O_3$, $Cr_2O_3$, $Fe_2O_3$, $SiO_2$, TiO, $ZrO_2$, BN, $Cr_3B_2$, $TiB_2$, $TaB_2$ (hexagonal), BN (cubic), $Si_3N_4$, AlN, $TaSi_2$, and $Fe_4Si_3$.

4. The bearing of claim 1, wherein the hard particles have an average size in the range of 0.5–150 µm.

5. The bearing of claim 1, wherein the hard particles in the hard particle layer comprise up to 0.5–5.0 area percent of the hard particle layer.

6. A multilayer sliding bearing, comprising:
a metal backing layer having a bearing surface;
a metal bearing liner layer attached to the bearing surface of said metal backing layer;
said metal bearing liner layer having a layer of hard particles embedded therein only at an outer surface thereof to a depth of 0.1 to 1 µm;
a metal barrier layer deposited over the outer surface of said metal bearing liner layer;
said metal barrier layer also having an outer surface thereof; and
at least one metal overplate layer deposited over the outer surface of said metal barrier layer.

7. The bearing of claim 6, wherein the hard particles comprise a material selected from a group consisting of pure elements and metal alloys which have a hardness greater than a hardness of the metal bearing liner layer, metal carbides, metal silicides, metal nitrides and metal borides.

8. The bearing of claim 7, wherein the group is W, Ta, Ti, Cr, Si, SiC, $B_4C$, $Cr_{23}C_6$, TaC, TiC, WC, ZrC, $Al_2O_3$, $Cr_2O_3$, $Fe_2O_3$, $SiO_2$, TiO, $ZrO_2$, BN, $Cr_3B_2$, $TiB_2$, $TaB_2$ (hexagonal), BN (cubic), $Si_3N_4$, AlN, $TaSi_2$, and $Fe_4Si_3$.

9. The bearing of claim 6, wherein the hard particles have an average size in the range of 0.5–150 µm.

10. The bearing of claim 6, wherein the hard particles in the hard particle layer comprise up to 0.5–5.0 area percent of the hard particle interface layer.

11. A method of making a multilayer sliding bearing, comprising the steps of:
    fabricating a metal backing layer having a bearing surface;
    attaching a metal bearing liner layer having an outer surface to the bearing surface of the metal backing layer;
    embedding a layer of hard particles in only the outer surface of the metal bearing liner layer to a depth of 0.1 to 1 µm; and
    depositing at least one metal overplate layer over the outer surface of said metal bearing liner layer.

12. The method of claim 11, comprising the further step of:
    finishing the outer surface of the metal bearing liner layer by at least a portion of the hard particle layer following the step of embedding the hard particles and prior to the step of depositing the metal overplate layer.

13. The method of claim 12, further comprising the step of:
    degreasing the outer surface of the metal bearing liner layer following the step of finishing the outer surface and prior to the step of depositing the at least one metal overplate layer.

14. A method of making a multilayer sliding bearing, comprising the steps of:
    fabricating a metal backing layer having a bearing surface;
    attaching a metal bearing liner layer having an outer surface to the bearing surface of the metal backing layer;
    embedding a layer of hard particles in only the outer surface of the metal bearing liner layer to a depth of 0.1 to 1 µm;
    depositing at least one barrier layer over the outer surface of the metal bearing liner layer; and
    depositing at least one metal overplate layer over an outer surface of the barrier layer.

15. The method of claim 14, comprising the further step of:
    finishing the outer surface of the metal bearing liner layer by at least a portion of the hard particle layer following the step of embedding the hard particles and prior to the step of depositing the metal overplate layer.

16. The method of claim 15, further comprising the step of:
    degreasing the outer surface of the metal bearing liner layer following the step of finishing the outer surface and prior to the step of depositing the at least one metal overplate layer.

* * * * *